US011672200B2

(12) United States Patent
Mittmann et al.

(10) Patent No.: US 11,672,200 B2
(45) Date of Patent: Jun. 13, 2023

(54) METHOD FOR DETERMINING A ROBOT POSITION OF AN AUTONOMOUS MOBILE GREEN AREA MAINTENANCE ROBOT ON AN AREA TO BE MAINTAINED, METHOD FOR OPERATING AN AUTONOMOUS MOBILE GREEN AREA MAINTENANCE ROBOT ON AN AREA TO BE MAINTAINED, AND GREEN AREA MAINTENANCE SYSTEM

(71) Applicant: Andreas Stihl AG & Co. KG, Waiblingen (DE)

(72) Inventors: Ulrich Mittmann, Starnberg (DE); Patrick Henkel, Emmering (DE); Andreas Strohmaier, Weissach (DE); Sebastian Kraemer, Innsbruck (AT); Petrus Van Zutven, Innsbruck (AT)

(73) Assignee: Andreas Stihl AG & Co. KG, Waiblingen (DE)

( * ) Notice: Subject to any disclaimer, the term of this patent is extended or adjusted under 35 U.S.C. 154(b) by 262 days.

(21) Appl. No.: 17/105,077

(22) Filed: Nov. 25, 2020

(65) Prior Publication Data
US 2021/0153428 A1    May 27, 2021

(30) Foreign Application Priority Data
Nov. 27, 2019    (EP) ..................... 19211898

(51) Int. Cl.
*A01D 34/00*    (2006.01)
*G05D 1/02*    (2020.01)
*A01D 101/00*    (2006.01)
(52) U.S. Cl.
CPC ......... *A01D 34/008* (2013.01); *G05D 1/0278* (2013.01); *A01D 2101/00* (2013.01); *G05D 2201/0208* (2013.01)

(58) Field of Classification Search
CPC ............ A01D 34/008; A01D 2101/00; G05D 1/0278; G05D 2201/0208
(Continued)

(56) References Cited

U.S. PATENT DOCUMENTS 8,027,761 B1 * 9/2011 Nelson ................. G05D 1/0276
701/50
2018/0352731 A1 * 12/2018 Hans ...................... A01D 43/16
(Continued)

FOREIGN PATENT DOCUMENTS

CH        705 178 A2    12/2012
EP      2 287 698 A1     2/2011
(Continued)

*Primary Examiner* — Mahmoud Gimie
(74) *Attorney, Agent, or Firm* — Crowell & Moring LLP

(57) ABSTRACT

A method for determining a robot position of an autonomous mobile green area maintenance robot on an area to be maintained includes the steps of: determining at least one robot position of the autonomous mobile green area maintenance robot by virtue of the green area maintenance robot receiving at least one global positioning signal from a global positioning system; determining a station position for at least one local positioning station on the basis of the at least one determined robot position and by interchanging at least one local positioning signal between the green area maintenance robot and the at least one positioning station; and determining a robot position of the green area maintenance robot on the area to be maintained on the basis of the at least one determined station position and by interchanging at least one local positioning signal between the green area maintenance robot and the at least one positioning station.

15 Claims, 1 Drawing Sheet

(58) Field of Classification Search
USPC .......................................................... 701/23
See application file for complete search history.

(56) References Cited

U.S. PATENT DOCUMENTS

| | | | |
|---|---|---|---|
| 2018/0352732 A1* | 12/2018 | Hans | G05D 1/0225 |
| 2019/0041869 A1 | 2/2019 | Shao et al. | |
| 2019/0049593 A1 | 2/2019 | He et al. | |
| 2019/0064835 A1* | 2/2019 | Hoofard | B60T 7/22 |
| 2019/0339710 A1* | 11/2019 | Sørensen | G01S 19/12 |
| 2019/0346848 A1 | 11/2019 | Zhou et al. | |

FOREIGN PATENT DOCUMENTS

| | | | | |
|---|---|---|---|---|
| EP | 3 557 355 A1 | | 10/2019 | |
| JP | 2001337157 A | * | 12/2001 | |
| JP | 2015001906 A | * | 1/2015 | |
| WO | WO 99/12793 A1 | | 3/1999 | |
| WO | WO 2017/092798 A1 | | 6/2017 | |
| WO | WO-2018224678 A1 | * | 12/2018 | ........... A01B 69/008 |

* cited by examiner

METHOD FOR DETERMINING A ROBOT POSITION OF AN AUTONOMOUS MOBILE GREEN AREA MAINTENANCE ROBOT ON AN AREA TO BE MAINTAINED, METHOD FOR OPERATING AN AUTONOMOUS MOBILE GREEN AREA MAINTENANCE ROBOT ON AN AREA TO BE MAINTAINED, AND GREEN AREA MAINTENANCE SYSTEM

CROSS REFERENCE TO RELATED APPLICATION

This application claims priority under 35 U.S.C. § 119 from European Patent Application No. 19211898.2, filed Nov. 27, 2019, the entire disclosure of which is herein expressly incorporated by reference.

BACKGROUND AND SUMMARY OF THE INVENTION

The invention relates to a method for determining a robot position of an autonomous mobile green area maintenance robot on an area to be maintained, to a method for operating an autonomous mobile green area maintenance robot on an area to be maintained comprising such a method for determining a robot position of the green area maintenance robot on the area, and to a green area maintenance system for determining a, in particular the, robot position of an, in particular the, autonomous mobile green area maintenance robot on an, in particular the, area to be maintained.

The invention is based on the object of providing a method for determining a robot position of an autonomous mobile green area maintenance robot on an area to be maintained and a green area maintenance system for determining a, in particular the, robot position of an, in particular the, autonomous mobile green area maintenance robot on an, in particular the, area to be maintained, which respectively has improved properties. Furthermore, the invention is based on the object of providing a method for operating an autonomous mobile green area maintenance robot on an area to be maintained comprising such a method for determining a robot position of the green area maintenance robot on the area.

The invention achieves this object by providing a method and a green area maintenance system in accordance with the independent claims. Advantageous developments and/or configurations of the invention are described in the dependent claims.

The method according to the invention is designed or configured to determine, in particular automatically determine, a robot position of an autonomous mobile green area maintenance robot on an area to be maintained. The method has the steps of: a) determining, in particular automatically determining, at least one, in particular global, robot position of the autonomous mobile green area maintenance robot, in particular on the area to be maintained, by virtue of the green area maintenance robot receiving, in particular automatically receiving, at least one global positioning signal from a global positioning system. b) determining, in particular automatically determining, a station position, in particular an associated and/or global station position, for at least one local positioning station on the basis of the at least one determined, in particular global, robot position and by interchanging, in particular automatically interchanging, at least one local positioning signal between the green area maintenance robot, in particular at the at least one determined robot position, and the at least one positioning station. c) determining, in particular automatically determining, a robot position, in particular a different and/or local robot position, of the green area maintenance robot on the area to be maintained on the basis of the at least one determined station position and by interchanging, in particular automatically interchanging, at least one local positioning signal between the green area maintenance robot, in particular at the robot position to be determined, and the at least one positioning station.

The method, in particular step c), makes it possible to determine the robot position by means of the at least one positioning station if this is not enabled by means of step a) or the global positioning system. This may be the case in at least one region of the area in which the green area maintenance robot cannot receive the at least one global positioning signal, in particular of a minimum quality, in particular cannot adequately receive said signal for positioning, and which cannot be covered by the global positioning system, in particular cannot be adequately covered by said system for positioning. In particular, the at least one global positioning signal may be shaded or shielded or distorted by an object at a boundary edge of the area and/or on the area in the at least one region. The method, in particular steps a) and c), therefore enable(s) positioning in all regions of the area and make(s) it possible to completely cover the area, in particular in a minimum quality. This therefore makes it possible to autonomously maintain the complete area by means of the green area maintenance robot and in all regions.

Furthermore, the method, in particular step b), makes it possible to determine or know the at least one, in particular global, station position on the basis of step a) if this is enabled by means of step a) or the global positioning system. This may be the case in at least one, in particular different, region of the area in which the green area maintenance robot can receive the at least one global positioning signal, in particular of a minimum quality and/or adequately for positioning, or which may be covered by the global positioning system, in particular adequately covered for positioning. Step b) therefore enables step c).

Autonomously maintain may mean that the green area maintenance robot can move and/or act independently, automatically, in a self-determined manner, in a self-controlled manner and/or independently of a user and/or can select at least one parameter, such as in particular a route parameter, and/or a turning point. Additionally or alternatively, autonomously maintain may mean that the green area maintenance robot can independently start and/or end maintenance. Further additionally or alternatively, the green area maintenance robot need not or may not be controlled by a user during autonomous maintenance, in particular not be controlled in a remote-controlled manner. In other words: during autonomous maintenance, the green area maintenance robot can carry out maintenance without human control and/or guidance, in particular. Further additionally or alternatively, the green area maintenance robot may be referred to as a service robot. Further additionally or alternatively, the green area maintenance robot may have a maintenance tool.

The area may be an open area, in particular unsealed ground, or a green area such as a meadow or a lawn.

The at least one global positioning signal and the at least one local positioning signal may be different.

The global positioning system and the at least one positioning station may be different.

Global can be referred to as absolute. Additionally or alternatively, local can be referred to as relative.

The interchange may be contactless, in particular wireless.

The at least one positioning station need not or may not receive the at least one global positioning signal, in particular directly or without using the green area maintenance robot.

The determination of the at least one robot position and/or of the at least one station position may comprise determination of position coordinates.

Step b) can be carried out at the same time as and/or after step a) in terms of time. Additionally or alternatively, step c) can be carried out after step b) in terms of time. Further additionally or alternatively, step a) can be repeated, in particular at the same time as and/or after step b) in terms of time and/or after step c) in terms of time. Further additionally or alternatively, step b) can be repeated, in particular at the same time as and/or after step a) in terms of time and/or after step c) in terms of time. Further additionally or alternatively, step c) can be repeated, in particular after step a) and/or step b) in terms of time. Further additionally or alternatively, either step a) or step c) can be carried out at a point in time.

In one development of the invention, the green area maintenance robot has, in particular, at least one, in particular electrical, and/or at least two, GNSS receiver(s) (GNSS: Global Navigation Satellite System). Step a) comprises: determining the robot position by virtue of the GNSS receiver receiving global positioning signals from a GNSS, in particular from the global positioning system in the form of a GNSS. In particular, the GNSS may comprise, in particular may be, NAVSTAR GPS, GLONASS, Galileo and/or BeiDou. Additionally or alternatively, the GNSS may have satellites, in particular including pseudolites. In particular, pseudolite may mean a terrestrial transmitter, wherein the pseudolite or terrestrial transmitter can emit a signal which can mimic that from a satellite. Additionally or alternatively, the GNSS may be a D-GNSS (D-GNSS: differential GNSS), in particular a D-GPS (D-GPS: differential GPS) and/or an rtk-GNSS. Further additionally or alternatively, the global positioning signals may have, in particular be, radio signals. Further additionally or alternatively, the at least one positioning station need not or may not have a GNSS receiver.

In one configuration of the invention, step a) is carried out if the GNSS receiver receives global positioning signals of a minimum quality from a minimum number of GNSS transmitters, in particular for positioning, in particular four GNSS transmitters, of the GNSS at the same time.

Additionally or alternatively, step c) is carried out if the GNSS receiver does not receive any global positioning signals of the minimum quality from the minimum number of GNSS transmitters, in particular for positioning, in particular four GNSS transmitters, of the GNSS at the same time.

In particular, at a point in time, the GNSS receiver can either receive global positioning signals of the minimum quality from the minimum number of GNSS transmitters or cannot receive any global positioning signals of the minimum quality from the minimum number of GNSS transmitters at the same time. In this respect, in particular with regard to the minimum quality and/or the minimum number, reference shall also be made to the relevant technical literature.

In one configuration of the invention, step c) comprises: determining the robot position by virtue of the GNSS receiver receiving global positioning signals from the GNSS if the GNSS receiver receives global positioning signals, in particular of the minimum quality, from the GNSS. This makes it possible to determine the robot position in a more accurate manner. In particular, the GNSS receiver may receive global positioning signals, in particular of the minimum quality, from fewer than the minimum number of, but more than zero, GNSS transmitters at the same time.

In one development of the invention, step b) comprises: determining the, in particular at least one, station position by measuring, in particular automatically measuring, at least one distance and/or at least one direction between the green area maintenance robot and the, in particular at least one, positioning station on the basis of the at least one interchanged local positioning signal.

Additionally or alternatively, step c) comprises: determining the robot position by measuring, in particular automatically measuring, at least one distance and/or at least one direction between the green area maintenance robot and the at least one positioning station on the basis of the at least one interchanged local positioning signal.

In particular, the at least one distance can be measured by measuring a propagation time of the at least one interchanged local positioning signal.

In one development of the invention, step a) comprises: determining different, in particular three different, robot positions. Step b) comprises: determining the, in particular at least one, station position on the basis of the different determined robot positions and by means of lateration, in particular at least trilateration, and/or angulation, in particular triangulation, on the basis of the different interchanged local positioning signals.

Additionally or alternatively, step b) comprises: determining different, in particular three different, station positions for different, in particular three different, positioning stations. Step c) comprises: determining the robot position on the basis of the different determined station positions and by means of lateration, in particular at least trilateration, and/or angulation, in particular triangulation, on the basis of the different interchanged local positioning signals.

In particular, the lateration can be carried out on the basis of measured distances. Additionally or alternatively, the angulation may be carried out on the basis of measured directions. Further additionally or alternatively, the different robot positions can be reached by moving the green area maintenance robot. Further additionally or alternatively, the positioning stations may have different identifications for distinguishability, in particular by the green area maintenance robot.

In one development of the invention, the interchanging of the, at least one, local positioning signal comprises: transmission, in particular automatic transmission, of the local positioning signal from the green area maintenance robot and reception, in particular automatic reception, of the transmitted local positioning signal by the positioning station.

Additionally or alternatively, the interchanging of the, in particular at least one, local positioning signal comprises: transmission, in particular automatic transmission, of the local positioning signal from the green area maintenance robot, reflection, in particular automatic reflection, of the transmitted local positioning signal by the positioning station and reception, in particular automatic reception, of the reflected local positioning signal by the green area maintenance robot.

Further additionally or alternatively, the interchanging of the, in particular at least one, local positioning signal comprises: transmission, in particular automatic transmission, of the local positioning signal from the positioning station and reception, in particular automatic reception, of the transmitted local positioning signal by the green area maintenance robot.

Further additionally or alternatively, the interchanging of the, in particular at least one, local positioning signal comprises: transmission, in particular automatic transmission, of the local positioning signal from the positioning station, reflection, in particular automatic reflection, of the transmitted local positioning signal by the green area maintenance robot and reception, in particular automatic reception, of the reflected local positioning signal by the positioning station.

In particular, the green area maintenance robot and/or the at least one positioning station may, in particular each, have an LPS transmitter (LPS: local positioning system) for transmitting the local positioning signal, an LPS reflector, in particular an LPS transponder, for reflecting the local positioning signal and/or an LPS receiver for receiving the local positioning signal.

The local positioning signal may have an optical or acoustic signal, in particular may be an optical or acoustic signal.

In one development of the invention, the local positioning signal has a radio signal, in particular is a radio signal. In particular, the green area maintenance robot and/or the at least one positioning station may, in particular each, have a radio transmitter for transmitting the radio signal, a radio reflector, in particular a radio transponder, for reflecting the radio signal and/or a radio receiver for receiving the radio signal. In particular, the at least one positioning station may, in particular respectively, be referred to as a radio beacon and/or a local positioning transmitter. Additionally or alternatively, the radio signal may have or be electromagnetic waves or oscillations in the radio-frequency range. The radio signal may have or be an ultra-wideband signal (UWB signal), a Bluetooth signal and/or a WLAN signal or WiFi signal.

In one development of the invention, the green area maintenance robot is designed or configured as a lawnmower robot having a lawnmower tool. In particular, the green area maintenance robot may be designed as a mulch mower robot. Additionally or alternatively, the lawnmower tool may comprise at least one mowing line, at least one plastic blade, at least one metal blade and/or one metal cutting blade with at least one cutting edge and/or with at least one cutting tooth. Further additionally or alternatively, the lawnmower tool may be designed as a rotating lawnmower tool and may be designed to mow the material to be mowed in a so-called free cutting method without a counter blade, in particular to produce a cutting operation by means of centrifugal force of the lawnmower tool.

In one development of the invention, the at least one local positioning station is stationed at, in particular on, a boundary edge of the area and/or on the area. This makes it possible for the green area maintenance robot to be able to receive the at least one local positioning signal, in particular of a minimum quality, in at least one region of the area in which the green area maintenance robot cannot receive the at least one global positioning signal, in particular of a minimum quality, in particular cannot adequately receive said signal for positioning. In particular, at the boundary edge may mean a maximum of 10 meters (m), in particular a maximum of 5 m, in particular a maximum of 2 m, in particular a maximum of 1 m, away from the boundary edge outside the area. Additionally or alternatively, the boundary edge may be defined by a wall, a fence, a hedge or otherwise.

The global positioning system, in particular a transmitter, in particular a GNSS transmitter, of the global positioning system, may be more than 10 m away from the boundary edge outside the area.

The method according to the invention is designed or configured to automatically operate an, in particular the, autonomous mobile green area maintenance robot on an, in particular the, area to be maintained. The method comprises a method as described above for determining a, in particular the, robot position of the autonomous mobile green area maintenance robot on the area to be maintained. Furthermore, the method has the step of: controlling, in particular automatically controlling, a movement of the green area maintenance robot on the area on the basis of the determined, in particular global or local, robot position in such a manner that the green area maintenance robot remains on the area, in particular within the boundary edge of the area. In particular, the control can be additionally carried out on the basis of a defined sequence of boundary edge positions, in particular boundary edge position coordinates, of the boundary edge.

The green area maintenance system according to the invention is designed or configured to determine, in particular automatically determine, a, in particular the, robot position of an, in particular the, autonomous mobile green area maintenance robot on an, in particular the, area to be maintained, in particular to carry out a method as described above. The green area maintenance system has the autonomous mobile green area maintenance robot, and, in particular the, at least one local positioning station. Furthermore, the green area maintenance system is designed or configured to determine, in particular automatically determine, in particular the, at least one robot position of the green area maintenance robot, in particular on the area to be maintained, by virtue of the green area maintenance robot receiving, in particular automatically receiving, in particular the, at least one global positioning signal from a, in particular the, global positioning system. In addition, the green area maintenance system is designed or configured to determine, in particular automatically determine, a, in particular the, station position for the at least one local positioning station on the basis of the at least one determined robot position and by interchanging, in particular automatically interchanging, in particular the, at least one local positioning signal between the green area maintenance robot and the at least one positioning station. Furthermore, the green area maintenance system is designed or configured to determine, in particular automatically determine, a, in particular the, robot position of the green area maintenance robot on the area to be maintained on the basis of the at least one determined station position and by interchanging, in particular automatically interchanging, in particular the, at least one local positioning signal between the green area maintenance robot and the at least one positioning station. The green area maintenance system may enable the same advantages as those described above for the method. In particular, the green area maintenance robot and/or the at least one positioning station may be partially or completely designed as described above for the method.

In one development, the green area maintenance system has a control device, in particular an electrical control device. The control device is designed or configured to control, in particular automatically control, a, in particular the, movement of the green area maintenance robot on the area on the basis of the determined robot position in such a manner that the green area maintenance robot remains on the area. In particular, the green area maintenance system, in particular the control device, can be designed to carry out a method as described above for operating the green area maintenance robot on the area. Additionally or alternatively, the green area maintenance robot may have the control device.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
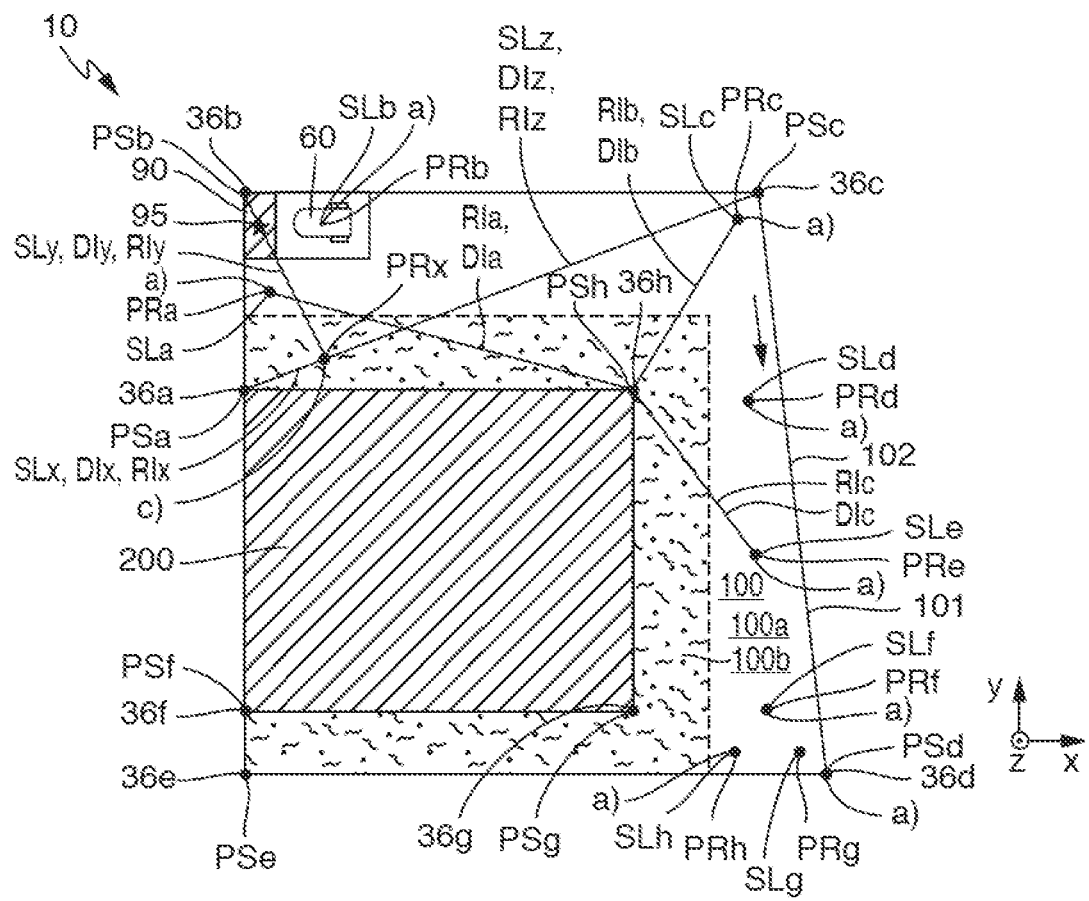
FIG. 1 shows a schematic view of methods and of a green area maintenance system having an autonomous mobile green area maintenance robot on the basis of a plan view of an area to be maintained by means of the green area maintenance robot in FIG. 1.
Figure 2:
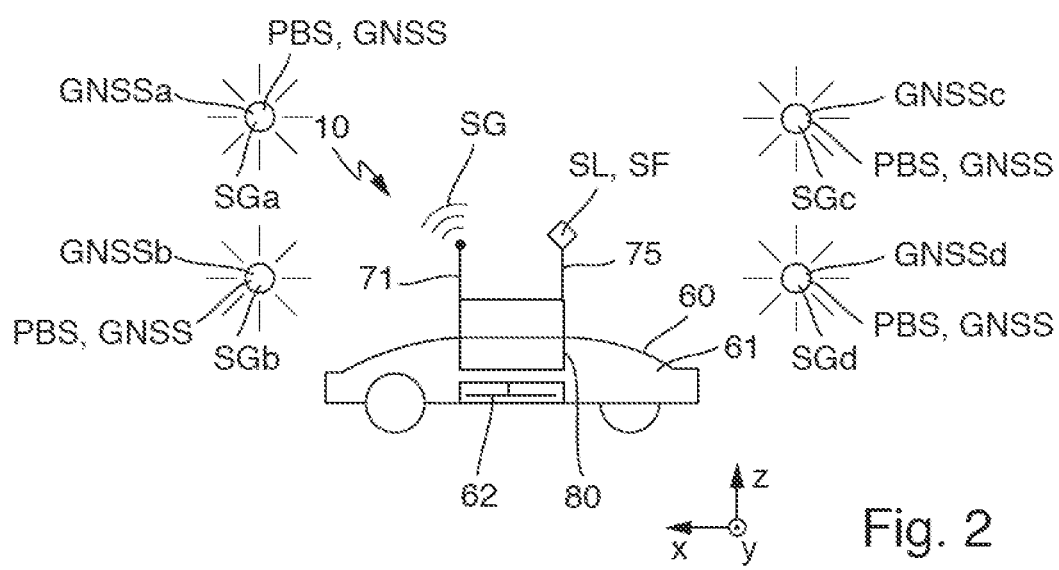
FIG. 2 shows a schematic view of the green area maintenance robot in FIG. 1 and of a global positioning system.

FIGS. 1 and 2 show a method for operating an autonomous mobile green area maintenance robot 60 on an area 100 to be maintained. The method comprises a method for determining a robot position PRa, PRb, PRc, PRd, PRe, PRf, PRg, PRh, PRx of the green area maintenance robot 60 on the area 100.

The method for determining the robot position PRa-h, PRx of the green area maintenance robot 60 on the area 100 has the steps of: a) determining at least one, in particular global, robot position PRa-h of the green area maintenance robot 60, in particular on the area 100, by virtue of the green area maintenance robot 60 receiving at least one global positioning signal SGa, SGb, SGc, SGd from a global positioning system PBS. b) determining a station position PSa, PSb, PSc, PSd, PSe, PSf, PSg, PSh, in particular an associated and/or global station position, for at least one local positioning station 36a, 36b, 36c, 36d, 36e, 36f, 36g, 36h on the basis of the at least one determined, in particular global, robot position PRa-h and by interchanging at least one local positioning signal SLa, SLb, SLc, SLd, SLe, SLf, SLg, SLh between the green area maintenance robot 60, in particular at the at least one determined robot position PRa-h, and the at least one positioning station 36a-h. c) determining a robot position PRx, in particular a different and/or local robot position, of the green area maintenance robot 60 on the area 100 to be maintained on the basis of the at least one determined station position PSa-h and by interchanging at least one local positioning signal SLx, SLy, SLz between the green area maintenance robot 60, in particular at the robot position PRx to be determined, and the at least one positioning station 36a-h.

FIGS. 1 and 2 also show a green area maintenance system 10 according to the invention for determining the robot position PRa-h, PRx of the green area maintenance robot 60 on the area 100, in particular for carrying out a method as described above. The green area maintenance system 10 has the green area maintenance robot 60 and the at least one local positioning station 36a-h. The green area maintenance system 10 is also designed to determine the at least one robot position PRa-h of the green area maintenance robot 60, in particular on the area 100, by virtue of the green area maintenance robot 60 receiving the at least one global positioning signal SGa-d from the global positioning system PBS. The green area maintenance system 10 is also designed to determine the station position PSa-h for the at least one local positioning station 36a-h on the basis of the at least one determined robot position PRa-h and by interchanging the at least one local positioning signal SLa-h between the green area maintenance robot 60 and the at least one positioning station 36a-h. The green area maintenance system 10 is also designed to determine the robot position PRx of the green area maintenance robot 60 on the area 100 on the basis of the at least one determined station position PSa-h and by interchanging the at least one local positioning signal SLx-z between the green area maintenance robot 60 and the at least one positioning station 36a-h.

In detail, the green area maintenance robot 60 has a GNSS receiver 71. Step a) comprises: determining the robot position PRa-h by virtue of the GNSS receiver 71 receiving global positioning signals SGa-d from a GNSS.

In particular, step a) is carried out if the GNSS receiver 71 receives global positioning signals SGa-d of a minimum quality from a minimum number of GNSS transmitters GNSSa GNSSb, GNSSc, GNSSd, in particular four GNSS transmitters, of the GNSS at the same time.

In the exemplary embodiment shown, this is the case at the robot position PRa-h or in a region 100a of the area 100, which region is not marked in FIG. 1. In other words: the region 100a is covered by the global positioning system PBS, in particular the GNSS, in particular is adequately covered for positioning.

Step c) is carried out if the GNSS receiver 71 does not receive any global positioning signals SGa-d of the minimum quality from the minimum number of GNSS transmitters GNSSa-d, in particular four GNSS transmitters, of the GNSS at the same time.

In the exemplary embodiment shown, this is the case at the robot position PRx or in a region 100b of the area 100, which region is dotted in FIG. 1. In other words: the region 100b is not covered by the global positioning system PBS, in particular the GNSS, in particular is not adequately covered for positioning.

In particular, the at least one global positioning signal SGc-d is shaded by an object 200, which is hatched in FIG. 1 and is in the form of a building, at a boundary edge 101 of the area 100 in the region 100b.

In detail, step c) comprises: determining the robot position PRx by virtue of the GNSS receiver 71 receiving global positioning signals SGa-b from the GNSS if the GNSS receiver 71 receives global positioning signals SGa-b, in particular of the minimum quality, from the GNSS.

In the exemplary embodiment shown, the GNSS has satellites, in particular in the form of GNSS transmitters GNSSa-d. In alternative exemplary embodiments, the GNSS may additionally have pseudolites, in particular in the form of GNSS transmitters.

Step b) also comprises: determining the, in particular at least one, station position PSa-h by measuring at least one distance DIa, DIb, DIc and/or at least one direction Ma, RIb, RIc between the green area maintenance robot 60 and the, in particular at least one, positioning station 36a-h on the basis of the at least one interchanged local positioning signal SLa-h.

Step c) also comprises: determining the robot position PRx by measuring at least one distance DIx, DIy, DIz and/or at least one direction RIx, RIy, RIz between the green area maintenance robot 60 and the at least one positioning station 36a-h on the basis of the at least one interchanged local positioning signal SLx-z.

Step a) also comprises: determining different, in particular three different, robot positions PRa-h. Step b) comprises:

determining the, in particular at least one, station position PSa-h on the basis of the different determined robot positions PRa-h and by means of lateration, in particular at least trilateration, and/or angulation, in particular triangulation, on the basis of the different interchanged local positioning signals SLa-h.

Step b) also comprises: determining different station positions PSa-h, in particular three different station positions, for different positioning stations 36a-h, in particular three different positioning stations. Step c) comprises: determining the robot position PRx on the basis of the different determined station positions PSa-h and by means of lateration, in particular at least trilateration, and/or angulation, in particular triangulation, on the basis of the different interchanged local positioning signals SLx-z.

In the exemplary embodiment shown, eight different robot positions PRa-h are determined in step a).

In step b), eight different station positions PSa-h are determined for eight different positioning stations 36a-h.

For example, in step b), the station position PSh is determined by measuring three distances DIa-c and/or three directions RIa-c between the green area maintenance robot 60, in particular at the three determined robot positions PRa, PRc, PRe, and the positioning station 36h on the basis of the three determined robot positions PRa, PRc, PRe and the three interchanged local positioning signals SLa, SLc, SLe and by means of trilateration on the basis of the measured distances DIa-c and/or triangulation on the basis of the measured directions RIa-c.

In step c), the robot position PRx is determined by measuring three distances DIx-z and/or three directions RIx-z between the green area maintenance robot 60, in particular at the robot position PRx to be determined, and the three positioning stations 36a-c on the basis of the three different determined station positions PSa-c and the three interchanged local positioning signals SLx-z and by means of trilateration on the basis of the measured distances DIx-z and/or triangulation on the basis of the measured directions RIx-z.

In alternative exemplary embodiments, either at least one distance or at least one direction can be determined by means of measurement. Additionally or alternatively, determination can be carried out by means of either lateration or angulation in alternative exemplary embodiments.

Furthermore, in the exemplary embodiment shown, the interchanging of the, in particular at least one, local positioning signal SLa-h, SLx-z comprises: transmission of the local positioning signal SLa-h, SLx-z from the positioning station 36a-h and reception of the transmitted local positioning signal SLa-h, SLx-z by the green area maintenance robot 60.

In alternative exemplary embodiments, the interchanging of the local positioning signal may comprise: transmission of the local positioning signal from the green area maintenance robot and reception of the transmitted local positioning signal by the positioning station, and/or transmission of the local positioning signal from the green area maintenance robot, reflection of the transmitted local positioning signal by the positioning station and reception of the reflected local positioning signal by the green area maintenance robot, and/or transmission of the local positioning signal from the positioning station, reflection of the transmitted local positioning signal by the green area maintenance robot and reception of the reflected local positioning signal by the positioning station.

In the exemplary embodiment shown, the at least one positioning station 36a-h has, in particular respectively, an LPS transmitter for transmitting the local positioning signal SLa-h, SLx-z. The green area maintenance robot 60 has an LPS receiver 75 for receiving the local positioning signal SLa-h, SLx-z.

In addition, the local positioning signal SLa-h, SLx-z has a radio signal SF, in particular is a radio signal SF.

Furthermore, the at least one local positioning station 36a-h is stationed at, in particular on, the boundary edge 101 of the area 100.

In alternative exemplary embodiments, the at least one local positioning station may be stationed on the area.

In the exemplary embodiment shown, the positioning stations 36a-h, in particular in the form of LPS transmitters and/or radio beacons, are stationed in corners of the area 100. Therefore, the positioning stations 36a-h, in particular in the form of LPS transmitters and/or radio beacons, span an LPS.

This makes it possible for the green area maintenance robot 60 to be able to receive the at least one local positioning signal SLx-z in the region 100b, in particular including in the region 100b and in all regions, of the, in particular complete, area 100. In other words: the region 100b, in particular including the region 100a and all regions or the area 100, is covered by the at least one positioning station 36a-h, in particular the LPS, in particular is completely covered or is adequately covered for positioning.

In the exemplary embodiment shown, the green area maintenance system 10 has a reference GNSS receiver 95. The reference GNSS receiver 95 is arranged in a stationary manner in the region of the area 100. The GNSS receiver 71 and the reference GNSS receiver 95 are designed to have a signal connection to one another in order to enable relatively accurate positioning.

In addition, in the exemplary embodiment shown, the green area maintenance system 10 has a base station 90 for the green area maintenance robot 60. In particular, the base station 90 is arranged at the boundary edge 101 of the area 100. In the exemplary embodiment shown, the base station 90 is designed as a charging station for recharging a rechargeable battery of the green area maintenance robot 60.

In detail, the base station 90 has the reference GNSS receiver 95.

Furthermore, the green area maintenance system 10 has a control device 80. The control device 80 is designed to control a movement of the green area maintenance robot 60 on the area 100 on the basis of the determined robot position PRa-h, PRx in such a manner that the green area maintenance robot 60 remains on the area 100, in particular within the boundary edge 101 of the area 100.

In the exemplary embodiment shown, the green area maintenance robot 60 has the control device 80.

The method for operating the green area maintenance robot 60 on the area 100 has the step of: controlling the movement of the green area maintenance robot 60 on the area 100 on the basis of the determined robot position PRa-h, PRx in such a manner that the green area maintenance robot 60 remains on the area 100, in particular by means of the control device 80.

In addition, the green area maintenance robot 60 is designed as a lawnmower robot 61 having a lawnmower tool 62.

In alternative exemplary embodiments, the green area maintenance robot may have an inertial measurement unit (IMU) and/or an odometry unit, in particular as backup, for determining the robot position.

Additionally or alternatively, if at least one station position is determined for a local positioning station, in particular if at least three station positions are determined for three local positioning stations, a further station position can be determined for at least one further local positioning station on the basis of the at least one determined station position and by interchanging at least one local positioning signal between the at least one positioning station and the at least one further positioning station, in particular in step b).

Further additionally or alternatively, step(s) a) and/or b) may comprise in alternative exemplary embodiments: determining the robot position, a robot speed of the green area maintenance robot, a robot orientation of the green area maintenance robot, a GNSS phase ambiguity, an acceleration bias and/or an odometry error by means of an estimation method. Additionally or alternatively, step b) may comprise: determining the station position and its squared norm by means of a Kalman filter or a Kalman filter method. In particular, the robot orientation can be determined as a quaternion. Further additionally or alternatively, the estimation method may be a Kalman filter or a Kalman filter method or an extended Kalman filter or an extended Kalman filter method.

As the exemplary embodiments shown and explained above make clear, the invention provides an advantageous method for determining a robot position of an autonomous mobile green area maintenance robot on an area to be maintained and an advantageous green area maintenance system for determining a, in particular the, robot position of a, in particular the, autonomous mobile green area maintenance robot on an, in particular the, area to be maintained, which respectively has improved properties. The invention also provides an advantageous method for operating an autonomous mobile green area maintenance robot on an area to be maintained comprising such a method for determining a robot position of the green area maintenance robot on the area.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for determining a robot position of an autonomous mobile green area maintenance robot on an area to be maintained, wherein the method comprises the steps of:
    a) determining at least one robot position of the autonomous mobile green area maintenance robot by virtue of the green area maintenance robot receiving at least one global positioning signal from a global positioning system;
    b) determining a station position for at least one local positioning station on the basis of the at least one determined robot position and by interchanging at least one local positioning signal between the green area maintenance robot and the at least one positioning station; and
    c) determining a robot position of the green area maintenance robot on the area to be maintained on the basis of the at least one determined station position and by interchanging at least one local positioning signal between the green area maintenance robot and the at least one positioning station,
        wherein the green area maintenance robot has a GNSS receiver,
        wherein step a) comprises: determining the robot position by virtue of the GNSS receiver receiving global positioning signals from a GNSS, and
        wherein at least one of:
            the step a) is carried out if the GNSS receiver receives global positioning signals of a minimum quality from a minimum number of GNSS transmitters of the GNSS at the same time, and
            the step c) is carried out if the GNSS receiver does not receive any global positioning signals of the minimum quality from the minimum number of GNSS transmitters of the GNSS at the same time.

2. The method according to claim 1,
    wherein step c) comprises: determining the robot position by virtue of the GNSS receiver receiving global positioning signals from the GNSS when the GNSS receiver receives global positioning signals of the minimum quality from the GNSS.

3. The method according claim 1, wherein at least one of:
    the step b) comprises: determining the station position by measuring at least one distance and/or at least one direction between the green area maintenance robot and the positioning station on the basis of the at least one interchanged local positioning signal, and
    the step c) comprises: determining the robot position by measuring at least one distance and/or at least one direction between the green area maintenance robot and the at least one positioning station on the basis of the at least one interchanged local positioning signal.

4. The method according to claim 1, wherein the interchanging of the local positioning signals comprises at least one of:
    transmission of the local positioning signal from the green area maintenance robot and reception of the transmitted local positioning signal by the positioning station,
    transmission of the local positioning signal from the green area maintenance robot, reflection of the transmitted local positioning signal by the positioning station and reception of the reflected local positioning signal by the green area maintenance robot,
    transmission of the local positioning signal from the positioning station and reception of the transmitted local positioning signal by the green area maintenance robot, and
    transmission of the local positioning signal from the positioning station, reflection of the transmitted local positioning signal by the green area maintenance robot and reception of the reflected local positioning signal by the positioning station.

5. The method according to claim 1, wherein the local positioning signal has or is a radio signal.

6. The method according to claim 1, wherein the green area maintenance robot is a lawnmower robot having a lawnmower tool.

7. The method according to claim 1, wherein the at least one local positioning station is stationed at a boundary edge of the area and/or on the area.

8. The method according to claim 1, wherein the minimum number of GNSS transmitters is four.

9. The method according to claim 1, further comprising:
    controlling a movement of the green area maintenance robot on the area on the basis of the determined robot position in such a manner that the green area maintenance robot remains on the area.

10. A method for determining a robot position of an autonomous mobile green area maintenance robot on an area to be maintained, wherein the method comprises the steps of:
- a) determining at least one robot position of the autonomous mobile green area maintenance robot by virtue of the green area maintenance robot receiving at least one global positioning signal from a global positioning system;
- b) determining a station position for at least one local positioning station on the basis of the at least one determined robot position and by interchanging at least one local positioning signal between the green area maintenance robot and the at least one positioning station; and
- c) determining a robot position of the green area maintenance robot on the area to be maintained on the basis of the at least one determined station position and by interchanging at least one local positioning signal between the green area maintenance robot and the at least one positioning station, wherein at least one of:
- the step a) comprises: determining different robot positions, and the step b) comprises: determining the station position on the basis of the different determined robot positions and by way of lateration and/or angulation on the basis of the different interchanged local positioning signals, and
- the step b) comprises: determining different station positions for different positioning stations, and the step c) comprises: determining the robot position on the basis of the different determined station positions and by way of lateration and/or angulation on the basis of the different interchanged local positioning signals.

11. The method according to claim 10, wherein
the different robot positions are three different robot positions,
the different station positions are three different station positions, and/or
the lateration is triangulation.

12. A green area maintenance system for determining a robot position of an autonomous mobile green area maintenance robot on an area to be maintained, comprising:
an autonomous mobile green area maintenance robot having a GNSS receiver; and
at least one local positioning station, and
wherein the green area maintenance system is designed to:
- a) determine at least one robot position of the green area maintenance robot by virtue of the GNSS receiver receiving global positioning signals from a GNSS,
- b) determine a station position for the at least one local positioning station on the basis of the at least one determined robot position and by interchanging at least one local positioning signal between the green area maintenance robot and the at least one positioning station, and
- c) determine a robot position of the green area maintenance robot on the area to be maintained on the basis of the at least one determined station position and by interchanging at least one local positioning signal between the green area maintenance robot and the at least one positioning station, and wherein at least one of:
- a) is carried out if the GNSS receiver receives global positioning signals of a minimum quality from a minimum number of GNSS transmitters of the GNSS at the same time, and
- c) is carried out if the GNSS receiver does not receive any global positioning signals of the minimum quality from the minimum number of GNSS transmitters of the GNSS at the same time.

13. The green area maintenance system according to claim 12, wherein the green area maintenance system further comprises:
a control device, wherein the control device is designed to control a movement of the green area maintenance robot on the area on the basis of the determined robot position in such a manner that the green area maintenance robot remains on the area.

14. A green area maintenance system for determining a robot position of an autonomous mobile green area maintenance robot on an area to be maintained, comprising:
an autonomous mobile green area maintenance robot; and
at least one local positioning station, and
wherein the green area maintenance system is designed to:
- a) determine at least one robot position of the green area maintenance robot by virtue of the green area maintenance robot receiving at least one global positioning signal from a global positioning system,
- b) determine a station position for the at least one local positioning station on the basis of the at least one determined robot position and by interchanging at least one local positioning signal between the green area maintenance robot and the at least one positioning station, and
- c) determine a robot position of the green area maintenance robot on the area to be maintained on the basis of the at least one determined station position and by interchanging at least one local positioning signal between the green area maintenance robot and the at least one positioning station, and wherein at least one of:
- a) comprises: determining different robot positions, and b) comprises: determining the station position on the basis of the different determined robot positions and by way of lateration and/or angulation on the basis of the different interchanged local positioning signals, and
- b) comprises: determining different station positions for different positioning stations, and the step c) comprises: determining the robot position on the basis of the different determined station positions and by way of lateration and/or angulation on the basis of the different interchanged local positioning signals.

15. The green area maintenance system according to claim 14, wherein the green area maintenance system further comprises:
a control device, wherein the control device is designed to control a movement of the green area maintenance robot on the area on the basis of the determined robot position in such a manner that the green area maintenance robot remains on the area.

* * * * *